Jan. 1, 1963 J. S. REID 3,071,177
APPARATUS FOR MAKING STRIP STRUCTURES
Filed April 20, 1960 2 Sheets-Sheet 2

INVENTOR.
JAMES S. REID
BY
Meyer, Baldwin, Doran & Young
ATTORNEYS

United States Patent Office 3,071,177
Patented Jan. 1, 1963

3,071,177
APPARATUS FOR MAKING STRIP STRUCTURES
James S. Reid, Hudson, Ohio, assignor to The Standard Products Company, Cleveland, Ohio, a corporation of Ohio
Filed Apr. 20, 1960, Ser. No. 23,551
5 Claims. (Cl. 153—67)

This invention relates to novel and improved apparatus for making strip structures, and more particularly to apparatus especially designed to make a helical strip structure from substantially flat strip stock.

A primary object of the present invention is the provision of new and improved apparatus for making a helical strip structure from substantially flat strip stock, and wherein said apparatus includes means for continuously winding said stock into helical configuration along a common axis.

Another object of the present invention is the provision of a new and improved apparatus especially designed to fabricate a helical strip structure from substantially flat strip stock and wherein said apparatus includes spindle means and means for winding strip stock into helical configuration about said spindle means.

Another object of the present invention is the provision of new and improved apparatus especially designed to make a helical strip structure from substantially flat strip stock, and wherein said apparatus includes spindle means and means for winding said strip stock around said spindle means, the latter being simultaneously rotatable with said winding means and effective therewith so as to helically advance said wound material longitudinally along said spindle means.

Still another object of the present invention is the provision of new and improved apparatus especially designed to make a helical strip structure from substantially flat strip stock, and wherein said apparatus includes spindle means and means rotatable about said spindle means being operable to wind said stock on the same, said spindle means being simultaneously rotatable with said winding means and effective therewith so as to helically advance said wound material longitudinally along said spindle means.

Additional objects and advantages of the present invention will be apparent to one skilled in the art to which it pertains and upon reference to the following description of one embodiment thereof, and which is illustrated in the accompanying drawings wherein.

Figure 5:
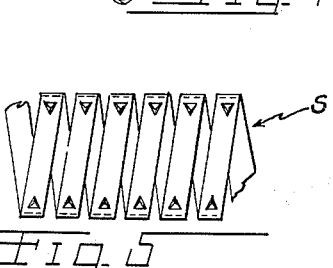
Figure 6:

FIG. 5 is a plan view of the strip structure formed by the instant apparatus and subsequent to its being flattened and pierced; and, FIG. 6 is an end view of a weatherstripping assembly utilizing the aforesaid strip structure, said structure being bent into U-shaped configuration subsequent to its being flattened and pierced to thus constitute a flexible core material for the weatherstripping assembly.

Briefly, the apparatus of the present invention is especially designed to form a coiled strip structure from substantially flat strip stock wherein adjacent coils thereof are helically arranged about a common axis.

Said strip structure is particularly applicable for use as a flexible core material in weatherstripping or the like such as is herein shown in FIG. 6, wherein a suitable fabric or other material is adapted to be wrapped or otherwise mounted over said core, the latter thus functioning to provide a sufficient degree of stiffness to the composite weatherstripping assembly while enabling the same to partake of various shapes so as to accommodate any number of configurations of body openings found for example, in the modern day automobile.

As is also seen in FIGS. 5 and 6, the instant strip structure, when used for the above described purpose, is preferably flattened by any suitable means and subsequently bent or folded into substantially U-shaped configuration, having, in addition, suitable barbs or projections formed on the free longitudinal edges thereof to thus enable the same to be properly anchored to the appropriate frame members of said body.

Figure 1:
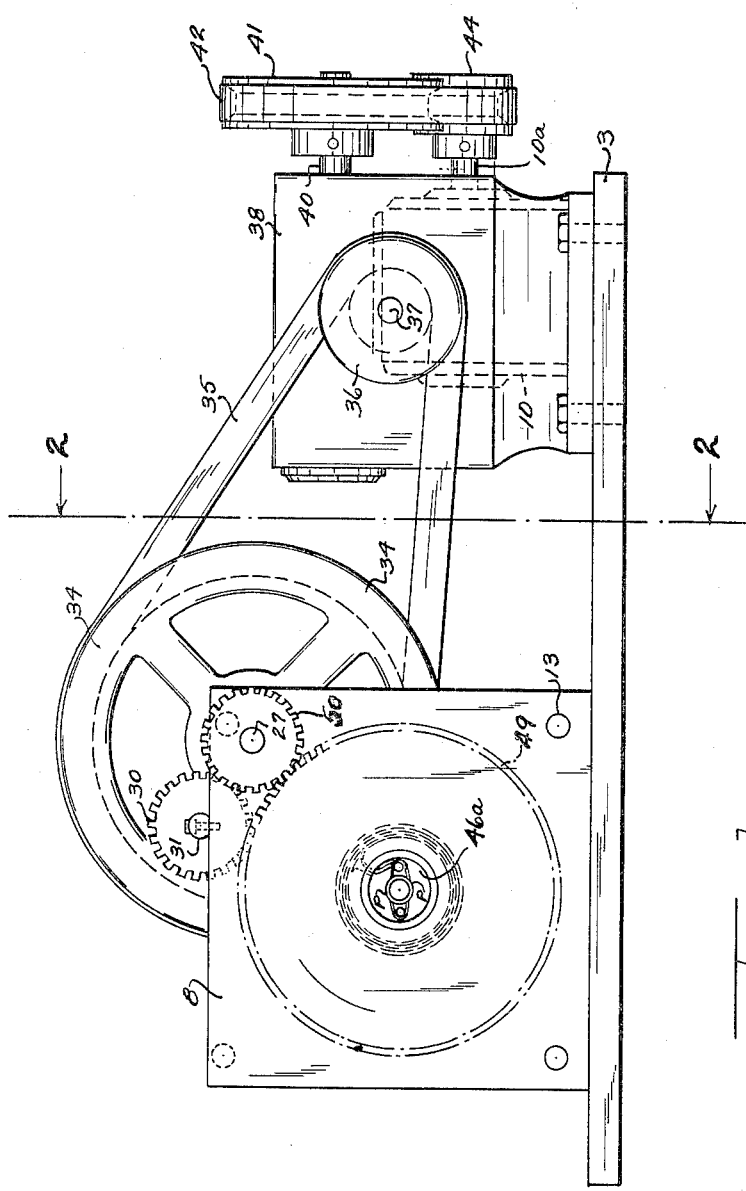
FIG. 1 is a front view in elevation of apparatus embodying the present invention.
Figure 2:
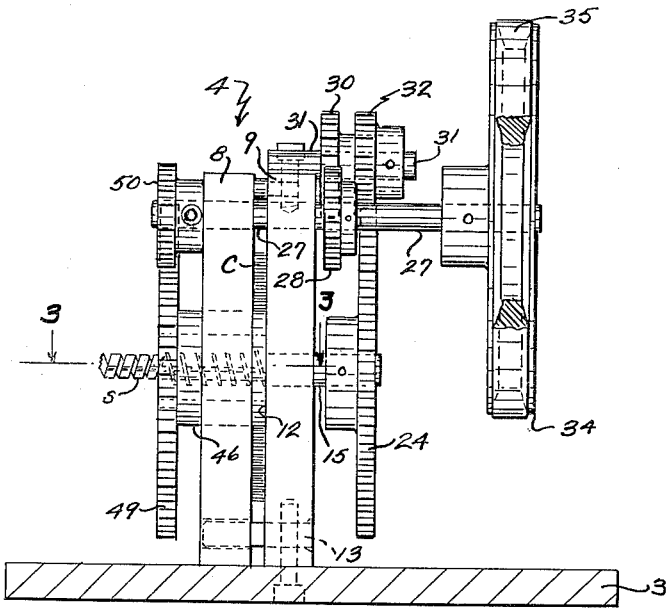
FIG. 2 is a section taken approximately on line 2—2 in FIG. 1.

Referring now to the drawings throughout which like elements are designated by the same reference character, and with particular reference directed to FIGS. 1 and 2, the embodiment of apparatus disclosed herein is seen to include a substantially flat base 3 upon which is mounted a winding head, the latter being identified in its entirety by the reference numeral 4, and which is drivably connected, in a manner as will be later explained in detail, to a suitable primary source of power such as an electric motor 10 whereby the same is preferably continuously actuatable to form the helical strip structure, as above referred to.

In its present form, the winding head 4 is seen to include a pair of rectangular support plates 8 and 9, said plates being preferably rigidly attached to the top surface of the aforementioned base 3 and extending substantially vertically upwardly therefrom in predetermined spaced relation to each other to thus define an opening or spacing 12 therebetween. Suitable pins 13 anchored to and extending between said plates may likewise be utilized, if so desired, to maintain the same in said spaced relation.

Figure 3:
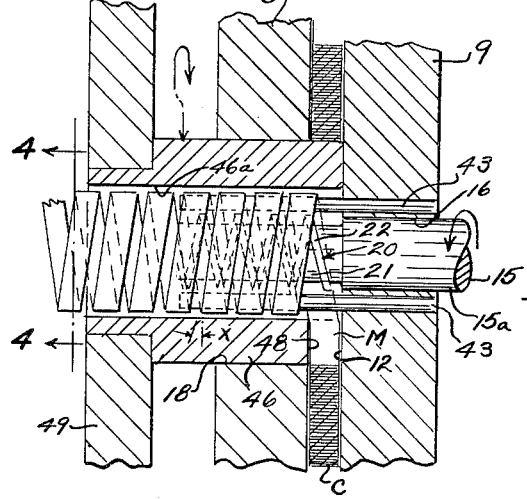
FIG. 3 is a section taken approximately on line 3—3 in FIG. 2.

A shaft or spindle 15 is journalled preferably centrally within said support plates, the support plate 9 as may be best seen in FIG. 3, being provided with a suitable bore as identified at 16, to thus rotatably accommodate a smooth shank portion 15a of said spindle, the latter extending substantially perpendicularly of said plate and projecting laterally across the aforementioned spacing 12, and thence into and through an enlarged bore 18 formed in the adjoining support plate 8. As may also be seen in FIG. 3, the spindle 15 is provided with a helical worm 20 of right-hand lead as referred to in the art, said worm being formed thereon adjacent its shank portion 15a, and having a continuous helical groove or valley 21 thus defining a similarly disposed and intervening helical land 22.

The end of the aforesaid shank portion 15a of said spindle extends outwardly from the support plate 9 and is seen to rigidly mount a drivable gear 24.

A drive shaft 27 is likewise rotatably journaled within the aforementioned support plates 8 and 9, preferably upwardly therein from the aforesaid spindle 15 and is seen to mount a drive gear 28 closely adjacent the support plate 9. Said drive gear 28 is adapted to mesh with an idler gear 30 rotatably journalled upon a stub shaft 31, carried on the top edge of support plate 9, said shaft likewise mounting a transfer gear 32 which is intended to mesh with the aforementioned drivable gear 24.

One end of the drive shaft 27 is seen to have a pulley wheel 34 carried thereon and about which is passed an endless belt 35, said belt likewise passing around a drive pulley 36 mounted on the output shaft 37 of a suitable speed reducing unit 38. The input shaft 40 of said unit likewise preferably mounts a pulley 41 about which is placed a similar endless belt 42 the latter also passing around a drive pulley 44 disposed on the shaft 8a of the aforementioned electric motor 10.

With this drive assembly, it is intended that upon actuation of said motor 10, the spindle 15 will also be rotatably actuated in a counterclockwise direction as viewed in FIG. 3 so as to advance the worm formed thereon lingitudinally therealong from right to left.

Figure 4:
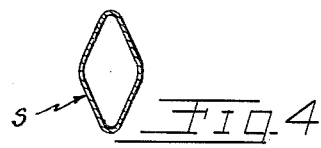
FIG. 4 is a section taken approximately in line 4—4 in FIG. 3 and showing the elliptical configuration of the strip structure.

As may be best seen in FIG. 4, the strip structure formed by the instant apparatus is intended to be substantially eliptical in cross section. Consequently, for this purpose the winding head 4 also includes a pair of pins 43 anchored within the support plate 9 preferably on diametrically opposite sides of the aforementioned spindle 15 and closely adjacent the periphery of the same. Each of said pins extends substantially laterally across the spacing 12 in parallel spaced relation to each other and the axis of said spindle, and projects into and through the enlarged bore 18 formed in the support plate 8.

Strip material, as identified by the reference character M, is intended to be projected into the spacing 12 substantially radially of the spindle 15 and thereafter wrapped around the pins 44 and said spindle. To accomplish this, the winding head 4 is seen to include a winding collet or sleeve 46 which is substantially cylindrical in configuration thus defining what is hereinafter referred to as a winding chamber 46a which extends longitudinally centrally therethrough, said collet being rotatably journalled within the aforementioned bore 18 in suport plate 8, whereby the pins 43 and interposed spindle 15 are thus encompassed centrally within said chamber in preselected spaced relation inwardly of the inner surface of the annular collet wall defining the same.

One end of said collet is seen to extend substantially completely across the spacing 12, and provided with a slot or opening 48, the latter extending completely through said collet radially of the axis thereof and communicating with the aforementioned winding chamber 46a.

The opposite end of the winding collet 46 rigidly mounts a winding gear 49, the latter, in turn, being adapted to mesh with a drive gear 50 mounted on the opposite end of the previously mentioned drive shaft 27.

The strip material is usually provided in coiled form such as is indicated in its entirety in FIG. 3 by the reference numeral C, said coil being disposed within the aforementioned spacing 12 between support plates 8 and 9 and surrounding the collet 46. The inner end of the coil is projected through the collet opening 48, said coil thus unwinding from its center toward its outermost convolution.

With this assembly, it is therefore intended that with the drive gear 50 actuated so as to drive the winding gear 49 clockwise as viewed in FIG. 3, the winding collet 46 is likewise rotatably actuated within the support plate bore 18 so as to carry its slot or opening 48 peripherally around the spindle 15 and pins 44, said coil C being likewise freely rotatably with said collet.

And, with said strip material extended within the aforementioned spacing 12 and projected into opening 48 and collet chamber 46a, it will be realized that upon rotating said collet 46, the strip material will be wrapped around said pins 43 and spindle 15 to thereby form successive helical coils, each of which is substantially eliptical-shape in section.

Simultaneously with the rotatable actuation of the aforesaid collet 46, the spindle 15 is likewise rotated by means of its connected gear train as above described, whereby the helical worm 20 formed thereon is operable to successively advance each of the aforesaid coils longitudinally along the same, in a manner as will now be described, to thus result in the fabrication of a helical strip structure which has a continuous wrap that is substantially eliptical-shaped in cross sectional configuration.

With reference directed to FIG. 3, it will be seen that the strip material is initially presented to the winding chamber 46a radially of the spindle 15 and pins 43, and is thereafter wrapped or coiled around the same by said winding collet 46 in a single plane that is substantially perpendicular to the axis of the spindle. Consequently it will be realized that as any one wrap or coil is completely formed on said spindle and opposed pins as a result of one complete revolution of said collet, said formed coil must first be moved to the left along the spindle before the next succeeding coil is formed thereon by said winding collet.

To accomplish this, it will be noted that as the strip material is wound or wrapped over the spindle 15, it partially overlies the helical land 22 of the aforesaid worm 20. And, with the spindle 15 being rotated in a counterclockwise direction as above referred to, said land is advanced from right to left. It is intended that with said rotation the leading edge of each convolution of said land will engage the trailing edge of each wrap or coil at spaced points thereon approximately as are indicated at p in FIG. 1, and is thus effective to propel or move the same forwardly longitudinally along said spindle, being likewise operable to twist said coil forwardly from said perpendicular plane to a plane that is at an acute angle relative to the axis of said spindle, said angle being identified by the reference character X in FIG. 3, and which, as will now be apparent, is also the helical lead of the strip structure as it is discharged from the left end of the winding chamber 46a. As will be realized, the spindle 15 is required to be rotated at a velocity sufficient to advance the land 22 thereon whereby as each coil is wrapped around the same it is moved forwardly along said spindle a distance to permit the next succeeding coil to be properly wrapped therearound.

As will now also be apparent, the helical lead of the strip structure formed by the instant apparatus may likewise be changed by varying the lead of the helical worm 20 and associated land 22.

Having thus described in detail the inventive concepts of the present invention, it will be realized that the same is susceptible to various modifications, combinations and arrangements of parts without departing from the scope of the appended claims.

What is claimed is:

1. Apparatus for making a strip structure comprising spindle means, stationary pin means disposed adjacent said spindle means, means for winding strip material on sain spindle means and said pin means, means for rotating said spindle means, and means on said spindle means responsive to the rotation of the same to helically advance said wound strip material longitudinally therealong.

2. Apparatus for making a strip structure comprising spindle means, pin means disposed adjacent said spindle means, means for winding strip material on said spindle means and said pin means, means for rotating said spindle means relative to said pin means, and a helical worm formed on said spindle means responsive to the rotation of the same to helically advance said wound strip material longitudinally therealong.

3. Apparatus for making a strip structure comprising a rotatable spindle, stationary pin means disposed on opposite sides of said spindle, means for winding strip material around said spindle and said pin means, means for rotating said spindle, and means on said spindle responsive to the rotation of the same to progressively advance the strip material wound thereon longitudinally therealong.

4. Apparatus for making a strip structure comprising a rotatable spindle, pin means disposed on diametrically opposite sides of said spindle and extending longitudinally therealong in parallel spaced relation, means for rotating said spindle relative to said pin means, and a helical worm formed on said spindle responsive to the rotation of the same to progressively advance the strip material wound thereon longitudinally therealong.

5. Apparatus for making a strip structure comprising a rotatable spindle, a pair of pins disposed on diametrically opposite sides of said spindle and extending longitudinally therealong in parallel spaced relation, means peripherally movable about said spindle for winding successive coils of strip material on said spindle and said pins, means for rotating said spindle, and a helical worm formed on said spindle responsive to the rotation of the same to progressively advance the strip material wound thereon longitudinally therealong.

References Cited in the file of this patent

UNITED STATES PATENTS

| | | |
|---|---|---|
| 603,175 | Collins | Apr. 26, 1898 |
| 1,946,870 | Moon | Feb. 13, 1934 |

FOREIGN PATENTS

| | | |
|---|---|---|
| 321,698 | Germany | June 11, 1920 |